Aug. 8, 1967 R. F. LIBHART 3,335,365
METHOD OF MEASURING INTERFACE RESISTANCE
IN ELECTRICAL CONNECTIONS
Filed Jan. 18, 1963 2 Sheets-Sheet 1
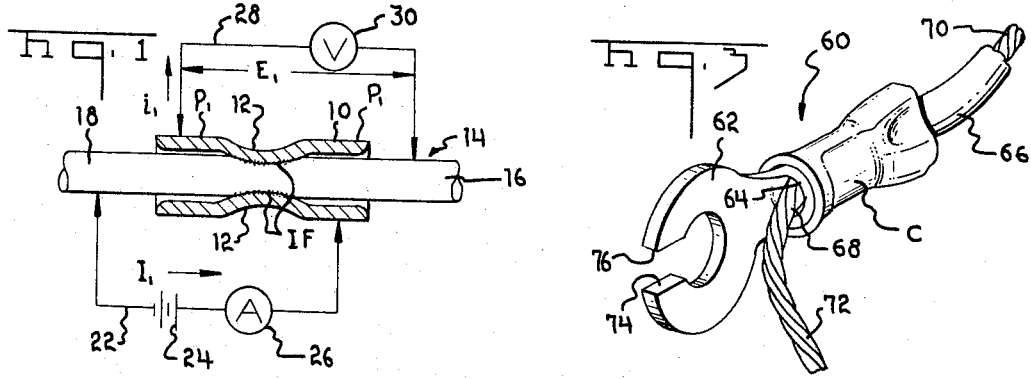
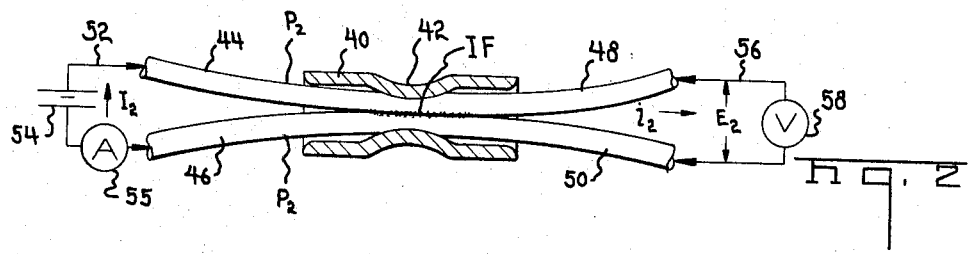
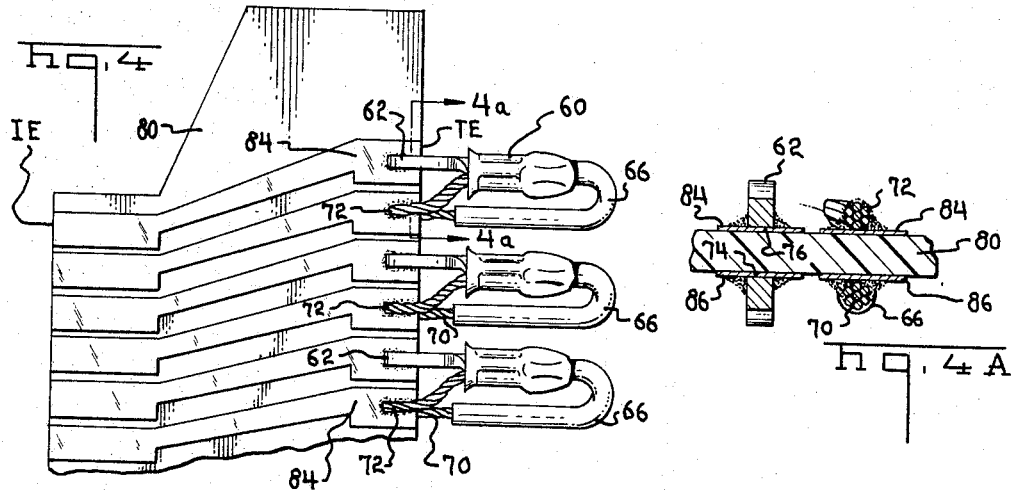
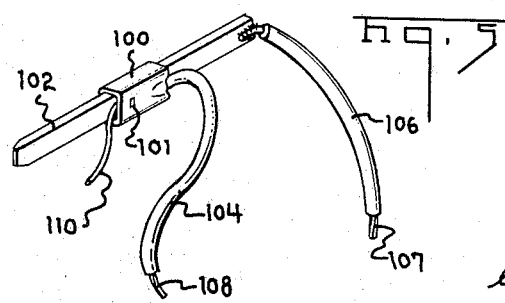
INVENTOR.
RICHARD F. LIBHART
BY
Curtis, Morris + Safford Aug. 8, 1967  R. F. LIBHART  3,335,365
METHOD OF MEASURING INTERFACE RESISTANCE
IN ELECTRICAL CONNECTIONS
Filed Jan. 18, 1963  2 Sheets-Sheet 2
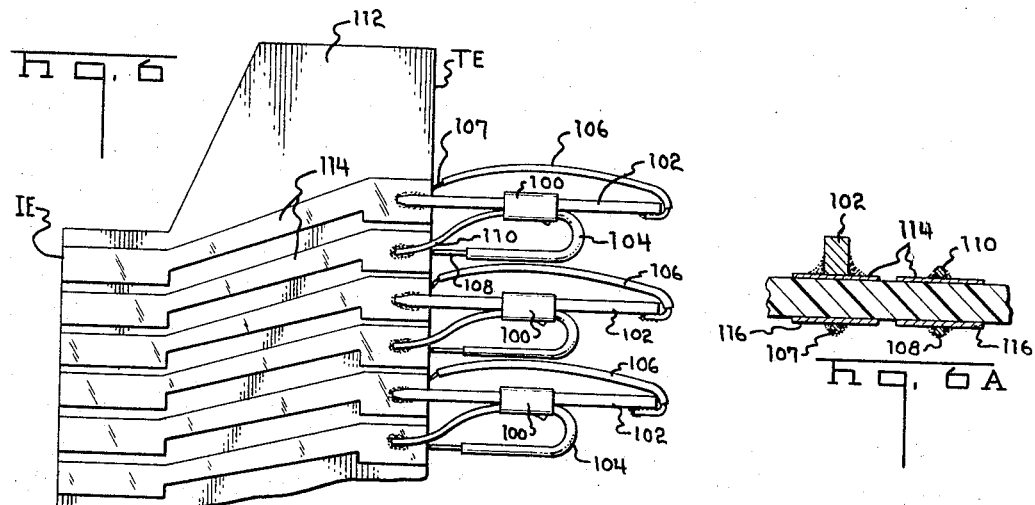
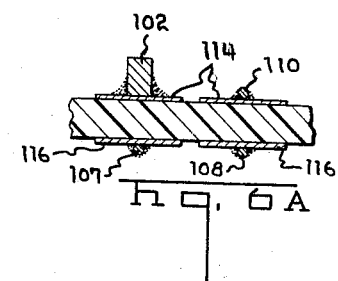
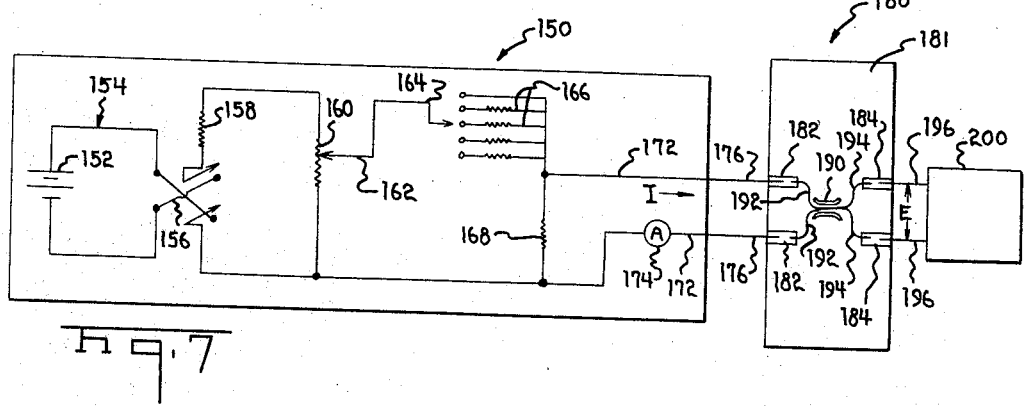
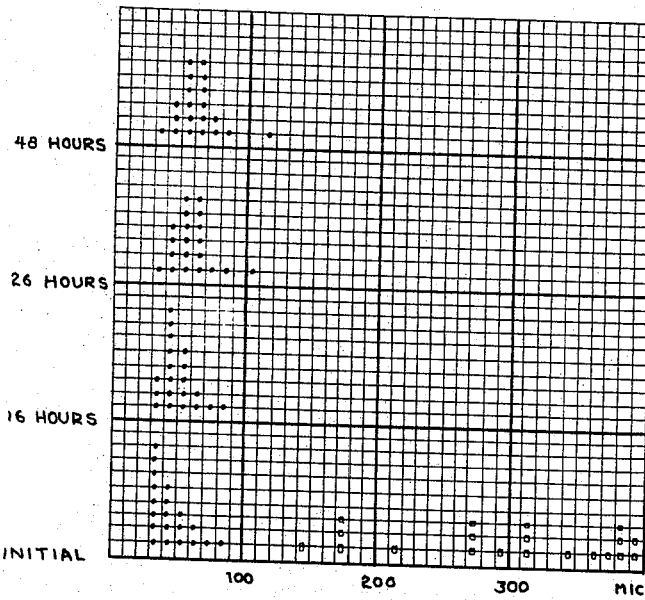
INVENTOR.
RICHARD F. LIBHART
BY

United States Patent Office 3,335,365
Patented Aug. 8, 1967

3,335,365
**METHOD OF MEASURING INTERFACE RESIST-
ANCE IN ELECTRICAL CONNECTIONS**
Richard F. Libhart, Bainbridge, Pa., assignor to
AMP Incorporated, Harrisburg, Pa.
Filed Jan. 18, 1963, Ser. No. 252,369
2 Claims. (Cl. 324—64)

This invention relates to an improved method of measuring the interface resistance of electrical connections and to means and method for testing the quality of electrical connections.

A widely accepted method of testing electrical connections for resistance characteristics is to pass a measured current through a connection and measure the millivolt drop across such connection utilizing a meter interconnected by the insertion of steel probes on each side of the connection. A refinement of this technique termed the "four terminal method" serves to substantially eliminate the resistance component represented by the voltage reading circuit including that of the test probes. On the other hand, the resistance of the conductive material between the probes is not eliminated nor is the resistance of the path existing between the probes always constant since the probes must be manually inserted during each test. Additionally, many of the newer connectors for interconnecting fine wire do not lend themselves to the use of probes with the result that it is difficult, if not impossible, to accomplish an accurate and consistent measurement of the connection resistance attributable to such connectors.

In attempting to measure the connection resistance introduced by fine wire connectors, it has been concluded that the present "four terminal method" of measuring interface resistance employing probes has the following shortcomings:

(1) Resistance measurements are adversely influenced by probe forces.

(2) Repeatability of resistance measurements is made difficult because of inconsistent probe placement, especially for stranded wire.

(3) Mechanical injuries occur to the sample under test due to repeated probing.

(4) The probing technique is unsatisfactory with respect to the gauges of wire less than .020 inch in diameter.

(5) The resistance readings obtained include the resistance values of extraneous material (wire or barrell length) masking the true value of connector resistance.

(6) Resistance readings taken are substantially affected by even slight differences in placement of current source instrumentation leads.

(7) With respect to many connection resistance measurement applications, wire resistance compensation is necessary thus making it possible to obtain negative resistance values.

Accordingly, it is one object of the present invention to provide an improved method of measuring interface resistance in electrical connections.

It is a further object of invention to provide an improved method of measuring connector resistance which avoids the effects of probing or instrumentation lead changes.

It is a still further object of invention to provide an improved interface resistance testing technique wherein it is possible to view small resistance changes in a sample under test over a relatively short period of time.

It is a further object of invention to provide a connector testing technique wherein connection samples may be fixedly mounted on test fixtures incorporating readout terminals which do not form a substantial part of the resistance measured.

It is another object of invention to provide method and means for measuring interface resistance in electrical connections in a manner whereby connection reliability may be predicted.

The foregoing objects are attained by the present invention by effectively extending instrumentation leads into the interface area between conductors in the connection under test. This is accomplished by placing a test current source across one portion of a given connection and placing voltage measurement leads across noncurrent carrying portions of such connection. In this manner, a current loop is formed to energize the interface area between conductors and a further loop is formed to measure the voltage drop across such interface area. This has the result of placing the voltage drop leads down inside the connection under test and across the contact area to be measured thus eliminating from measurement the usual extraneous material resistance which is present in the tests heretofore used.

The method of the invention contemplates the use of auxiliary paths extending through the connection to be tested and forming a fixed part thereof. Because of this, changeable probes need not be employed; the auxiliary paths becoming fixed probes joined at the point of interface contact area. Since each connection has its own built-in probes, a number of connectors to be tested may be permanently affixed to printed circuit cards by soldering with the result that testing of large numbers of samples may be rapidly carried out with similar circuit constants under more consistent conditions of environment.

The elimination of the relatively large resistance caused by the extraneous material included in prior art measurements permits voltage drop readings which are more accurately representative of the small contact resistance under test. This makes it possible to better evaluate the contact resistance in such connection.

In the prior art approach, a typical resistance measurement for a connection of 22 AWG conductors might be in the range of nine to eleven hundred micro-ohms with the actual contact resistance of the connection being less than 50 micro-ohms. Thus, slight deviations in the actual contact resistance would not be detected and a connection catastrophe would be necessary in order to produce any noticeable indication of the quality of connection.

Utilizing the technique of the invention it is possible to measure deviations of interface resistance of several micro-ohms both consistently and accurately and to thereby observe the expected changes in contact resistance immediately after the connection is made and up until the period when substantially all connector metal has relaxed to a stable state. Aside from the advantages gained in studying the characteristics of electrical connections in general, the method of the invention makes it possible to establish a new method of connection rating and specification which is more accurate and less costly than the methods presently employed.

Through applying the technique of the invention to various connections it has been discovered an intially low interface resistance measurement, followed by measurements giving similar readings throughout a period of approximately forty-eight hours indicates that the connection is and will be reliable for the remainder of its expected life. Experience has further shown that tests made in this manner at room temperature are accurate in predicting the reliability and efficiency of a given connection.

As a most important consideration, the testing technique of the invention permits accurate resistance measurements to be made on fine wire connectors which measurements could not heretofore be achieved.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

In the drawings:

FIGURE 1 is a schematic representation of the procedure and setup employed by the method of the invention with respect to one type of connection;

FIGURE 2 is a schematic representation of the procedure and setup employed by the invention with respect to a further type of connection;

FIGURE 3 is a perspective of the type of connection device shown in FIGURE 1 prepared in accordance with the method of the invention;

FIGURE 4 is a plan view showing a plurality of devices of the type shown in FIGURE 3 mounted in accordance with a further aspect of the method of the invention;

FIGURE 4a is a section taken along the lines 4a—4a of FIGURE 4;

FIGURE 5 is a perspective of the type of connection device shown in FIGURE 2 prepared in accordance with the aspect of the method of the invention;

FIGURE 6 is a plan view showing a plurality of the devices of the type shown in FIGURE 5 mounted in accordance with a further aspect of the method of the invention;

FIGURE 6a is a section taken along the lines 6a—6a of FIGURE 6;

FIGURE 7 is a schematic circuit diagram of the instrumentation employed in carrying out the method of the invention; and FIGURE 8 is a histogram typifying test readings taken on twenty samples throughout a test cycle of forty-eight hours.

Referring now to FIGURE 1, member 10 represents a typical crimp type connecting device which is normally used to terminate an electrical conductor such as 14. The indented portion 12 of connector 10 may be considered as representing the area of crimp and the cross hatched area IF may be considered as the contact area existing under the crimp portion 12 forming the contact path between conductor 14 and member 10. The characteristics of the path through area IF are considered to determine the efficiency and reliability of the termination between conductor and connector and the path resistance is considered as an index of such characteristics.

In accordance with the practice heretofore followed, an evaluation of the termination represented in FIGURE 1 would be accomplished by passing a current through conductor 14, through the interface contact area IF under investigation and through connector 10 with the measured voltage drop being taken through probes inserted at points $P_1$ across similar material paths and the resistance being calculated therefrom in accordance with Ohm's Law. The voltage drop thus measured would therefore include the sum of voltage drops existing between the points of probe application which would yield a resistance value including considerable extraneous material in addition to the resistance of the interface contact area IF. In accordance with the present invention, a current $I_1$ is caused to flow through the interface contact area IF by the application of a current through source circuit 22 connected to portion 18 of conductor 14 and to the connector 10 the contact interface area under test, $I_1$ being measured by ammeter 26 included in circuit 22. The voltage drop $E_1$ across the interface contact area IF is determined by a voltage measuring circuit 28 including meter 30 connected between any portion of connector 10 and an extended portion 16 of conductor 14 representing a path different from the path of principal current flow. By making the impedance of circuit 28 extremely large with respect to the resistance path to be measured, a very small excitation current results in such circuit and the voltage drops due to extraneous material and instrument leads is held to an insignificant value. Because of this, the voltage drop $E_1$ yields an $$R = \frac{E_1}{I_1}$$

which effectively represents the resistance of the path between connector 10 and conductor 14 through the interface area IF. Considering that the interface contact area may be thought of as a series-parallel resistance network, the effect of the foregoing is to place the voltage circuit leads directly across such network to produce a resistance value which is an index of the quality of connections accomplished by connector 10. With this technique extraneous material resistance compensation is made unnecessary.

FIGURE 1 depicts the general method of the invention utilized to measure contact interface resistance between a conductor and a connector which forms part of the electrical path; namely, a connector which is a terminal. While the connection shown in FIGURE 1 represents a crimped device, it is to be understood that the invention procedure may be utilized to investigate the contact area existent between other types of connections formed in other ways, as for example, the area formed between members through wedging, cold welding or other procedures wherein one part is forced into contact with another part without a definitive crimping operation being performed.

FIGURE 2 depicts a distinctly different type of connection wherein the connector itself does not act as a principal current carrying member but serves only to retain contact between conducting members. Thus, in FIGURE 2, member 40 represents a connector member having a deformed or crimped portion 42 adapted to force conductors 44 and 46 into electrical contact through an interface contact area IF. In measuring the resistance of this type of connection, the prior art procedure called for a voltage drop measurement through the use of probes inserted into conductors 44 and 46 proximate the point of conductor entry into member 42, as at points $P_2$. The resistance measurement produced therefrom would include the resistance of considerable amounts of extraneous material. In accordance with the method of the invention, the particular connection under study is prepared by extending portions of the conductors 44 and 46 to be connected through the connector 40 to form leads 48 and 50. A current $I_2$ measured by ammeter 55 is then caused to flow through the interface area IF from a current source 54 through leads 52 applied to conductors 44 and 46, the leads 48 and 50 being utilized to measure the voltage drop across the contact interface IF by a voltage measurement circuit including leads 56 and voltmeter 58. As in the embodiment shown in FIGURE 1, the impedance of the circuit including the ends of conductors 48 and 50, leads 56 and voltmeter 58 is held relatively high as compared with the resistance path through the area IF. This results in a current flow $i_2$ through the test portion of the circuit which is relatively small and therefore in a voltage drop across the voltage test circuit including leads 48 and 50 which is small in comparison with the voltage drop across the current supply circuit. The measured resistance of $R = E_2/I_2$ will, as above, more accurately represent an index of the quality of connection between conductors 44 and 46.

With the general concepts of the method of the invention in mind, reference will now be made to the specific technique employed to prepare connector samples for test. Referring to FIGURE 3, there is shown a typical pre-insulated ring terminal 60 crimped to insulated cable 66 in accordance with the method contemplated by the invention. The terminal 60 includes a crimp barrel 64 and a ring 62 integral therewith, the ring portion having been relieved to provide end portions 74 and 76. The conductor 66 includes a conductor wire portion 68 extending under the crimped area C and through the terminal barrel 64 to define a wire end 72 which serves to form one of the test leads in the manner described with respect to the circuit of FIGURE 1. The interface contact area between the conductor 66 and the terminal 60 may be examined by passing a measured current through the conductive path between wire 70 of conductor 66 and end portion 76 of the ring terminal with the voltage drop being measured by leads placed between wire 72 of conductor 66 and end portion 74 of the ring terminal.

The preparation of the terminal under test in the manner shown in FIGURE 3 permits mounting of a plurality of such terminals in the manner shown in FIGURE 4. Element 80 represents a copper clad insulating board suitably etched or otherwise prepared to define a series of conductive paths extending transversely across the board on both sides thereof to form individual circuit paths such as 84 and 86. The paths 84 and 86 at one edge end IE of board 80 are utilized for the application of instrumentation leads and the paths at the other edge and TE are utilized for mounting the connection to be tested. Considering the unit prepared in the manner shown in FIGURE 3, ring terminals such as 60 are fitted over top and bottom of the printed circuit paths 84 and 86 at end TE and soldered thereto with the lead ends 70 and 72 being soldered to opposite circuit paths 84 and 86 and ring portions 74 and 76 soldered to an adjacent pair of paths 84 and 86. FIGURE 4a shows this in section.

Test boards such as 80 containing five, ten or any suitable number of connections to be tested may be prepared in this manner. In carrying out the testing procedure, a measured current is supplied on an adjacent pair of paths 86 with the voltage measurement leads being placed on opposite paths 84 by any suitable means capable of achieving a stable contact with such path.

Referring now to FIGURE 5, there is shown an electrical connector structure prepared in accordance with a further aspect of the method of the invention. With connections of this type, the interface contact area under test exists between one conductor such as insulated cable 104 and another conductor such as bar 102 which may be considered as a wiretap post or similar rigid terminal device. Wedged over post 102 is a clip 100 having an indentation 101 serving to force and retain the conductive wire of cable 104 in intimate contact with post 102. Clips of this type include a depressed portion for wedging conductor 104 into contact with conductor 102. In such applications, clip 100 serves primarily to retain the two conductors in contact and not as a current carrying member, although in certain applications wherein the conductor or conductors are insulated, contact therebetween may be made at least in part through the retaining clip member. In the manner indicated in the description with reference to FIGURE 2, cable 104 is made to extend through the connector to include two end portions 108 and 110. In instances wherein the other conductor such as 102 is a relatively rigid member, as here shown, a further conductor such as 106 is affixed as by soldering to such conductor to form a suitable test lead.

FIGURE 6 shows a preferred rig for accomplishing the method of the invention with respect to connectors of the type shown in FIGURE 5. As in the arrangement of FIGURE 4, there is included an insulating board 112 having etched or formed paths 114 and 116 on opposite sides of the board. As indicated in FIGURES 6 and 6a, the free end of rigid conductor 102 of the assembly is affixed by soldering to one of the conductive paths 114 on board 112 with the end 107 of conductor 106 being attached to an opposite path 116 on the other side of board 112. The ends of the other conductor 104 are similarly secured by soldering to adjacent paths 114 and 116 of board 112 to complete the test circuit.

With a number of connectors under test mounted as shown in FIGURES 4 and 6, individual tests may be made by applying a current to one pair of circuit paths and measuring the contact resistance across the other pair of circuit paths associated with the connector. Thus, for example, with respect to FIGURE 6, the source current may be applied to one pair of adjacent paths 114 resulting in current flow through wire tip 110, a portion of conductor 104, through the interface resistance contact path under test, through post 102 and return through the other path 114. The voltage drop may be measured across paths 116 which includes a circuit through one circuit path 116, tip 107, conductor 106, through bar 102, the interface resistance contact area under test, conductor 104, tip 108 thereof and return. This procedure may be repeated for each of the connections on board 112.

Utilizing one or the other of the techniques shown with respect to FIGURE 4 and FIGURE 3, any fixed and certain non-fixed connections or terminations may be tested for interface resistance.

Referring now to FIGURE 7, a circuit setup for carrying out the method of the invention is shown in greater detail. The principal elements shown in FIGURE 7 include a variable current source 150, a test rig 180 mounting the connections under test and microvolt meter 200. The test rig 180 is similar in function to the test rigs shown in FIGURES 4 and 6 and includes a printed circuit board 181 having circuit paths 182 and 184 disposed and separated on opposite edges of one surface of the board. The connection under test 190 is shown schematically with input leads 192 soldered to circuit paths 182 and output leads 194 soldered to paths 184. In the manner indicated with respect to the testing technique shown in FIGURE 2, the interface resistance area under investigation is formed between two conductors held or terminated by 190. The input circuit path includes leads 176 from source 150 through the printed circuit paths 182, leads 192 and the interface resistance path under test. The voltage drop measured by meter 200 includes the meter leads 196, paths 184, conductor leads 194 and the interface resistance path under test.

The measured current source 150 includes a battery 152 of the type producing a rated voltage output with small variation. Interconnected thereto by leads 154 is a doublepole, double-throw switch 156 capable of supplying a current of either polarity to the source circuit. Interconnected to switch 156 is a voltage dividing and selecting network including a fixed resistance 158, and a first variable resistance 160, the circuit value of which may be varied by arm 162. The circuit further includes a number of different resistances 166 which may be selected by movement of arm 164 to provide different values of voltage across resistor 168. Connected across one of the resistances 168 are leads 172 including an ammeter 174 forming the final output stage of the measured current source 150. Output leads 176 are connected to the printed circuit paths 182 of the sample test board 180. With the arrangement considered above, the parameters I and E may be measured to determine the resistance of the connection under test in the manner above described.

A preferred mode of practicing the invention includes the following steps. The particular connection to be tested is first prepared in a number of samples, as for example, twenty in accordance with the techniques shown in FIGURE 3 or 5. Thereafter, each of the test samples is mounted on a test rig by soldering the appropriate leads to the appropriate paths in the manner shown in FIGURES 4 and 6. Individual current voltage readings for each test sample are then made by applying the current source 150, leads 176, in order, to each pair of printed circuit path related to a given sample with microvolt readings being taken on meter 200. It has been found that it is desirable to perform the test under similar conditions and therefore a limited environmental control is recommended. This may be accomplished by housing the instrumentation and test samples in a shielded room, as for example, a room surrounded by bronze screening suitably isolated from vibration. In this manner, temperature and radiation values may be held substantially constant during each test cycle. Referring now to FIGURE 8, there is shown a histogram of a series of tests performed on twenty samples over a period of forty-eight hours. The abscissae of the histograph is in micro-ohms and the ordinate is in frequency or number of test samples. The histogram is prepared by placing a mark indicating the resistance value measured from each sample over a number of test cycles taken at different times under approximately the same environmental conditions. Thus, considering an initial cycle of readings shown to the left in FIGURE 8 as dots, it will be apparent that eight of the samples measured 35 micro-ohms, five of the samples measured 45 ohms, three of the samples measured 55 ohms, two measured 65 ohms, one measured 75 ohms, and one measured 85 ohms. The pattern thus established for a given type of connection provides an indication of the general consistency of connection attributable to a given connector. A further evaluation of the histogram may be made following the initial cycle by determining the amount of deviation and number of deviating samples. The example shown in FIGURE 8 indicates that the connection under test is excellent in that the average resistance of the samples is low, the grouping is close and there are no wide deviations as to any sample reading.

A less satisfactory connection is indicated to the right of FIGURE 6 shown as squares; the samples including a relatively high average resistance, wide deviations and general inconsistency. Based upon these patterns inferences can be drawn both as to the connectors and as to the method employed in obtaining the connections including tooling, dies and connector means.

After a period of time of exposure to room temperature as the example in FIGURE 8 indicates, a second reading may be taken for each test sample and plotted in a position relative to the first sample on the histogram. Again, evaluation may be made by observing the consistency of readings, the deviation and the amount of deviation of given samples and the pattern of readings as compared with the initial reading. Thus with respect to the pattern of the second cycle of FIGURE 8, it is to be noted that the average of the readings has shifted to the right indicating an increase in resistance. This, of course, is to be expected with any crimp or wedge type connection due to metal relaxation of the parts in connection. Twenty-six and forty-eight hour cycles may be run for a more complete evaluation of the particular connection under test. It has been found that if the grouping of individual sample resistances is relatively close as indicated by the dot patterns in FIGURE 6, with few readings showing substantial deviations, and, if the average of sample resistances is below a certain value as for example, 100 micro-ohms, then the termination or connection may be considered as satisfactory. It has been further found that if the pattern of readings is low with a minimum number of wide deviations and if the readings of different cycles produce averages within 50 micro-ohms of each other over a number of cycles taken in a 48 hour period, the particular connection under test may be subjected to a test cycle including temperature changes, vibration and salt spray and the interface resistance will remain well below the maximum resistance value called out in typical military or civilian specification for connection resistance.

Based upon this technique connectors and connections may be rated by a resistance index which is free from compensation factors due to either different sizes of wire or extraneous material.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:
1. In a method for determining the quality of an electrical connection formed between an electrical wire conductor and a connector device having a conductive tubular portion adapted to receive such conductor the steps comprising inserting an electrical wire conductor within and through the conductive tubular portion of the connector device with first and second ends of said conductor extending out of the connector tubular portion, forcing said tubular portion into contact with the portion of the electrical conductor therewithin to define an interface therebetween in a manner providing a contact identical with that contact employed in use of the connector device to provide a connection with a conductor so as to permit said connection to be tested for resistance characteristics related to field use of the connector device, applying a measured current to the said first end of said electrical wire conductor from a DC source having a lead to complete a series circuit attached to said connector device at a point on said tubular portion on an opposite side of said interface from said first end of said electrical wire conductor whereby said current flows through said interface, measuring the voltage drop caused by said current through said interface through a circuit lead attached to the said second end of said electrical wire conductor and to said tubular portion at a point on the other side of said interface relative to said second end, the said voltage drop and current providing measured quantities which yield the resistance of said interface as an indication of the quality of the electrical connection formed between said connector device and said electrical wire conductor.

2. The method of determining the quality of electrical connection through a resistance measurement based on the relationship $R=E/I$ including the steps of forming a connection between first and second conductive members extending through a tubular member of a connector device, forcing said members into engagement in a manner identical to the connection formed for field use of said device to define a contact interface therebetween to be measured within said tubular member with the said conductors each having ends extending from each end of said tubular member, applying a current I to the said contact interface between said conductors through a circuit in series contact with the ends of the two conductors at one end of the said tubular member, measuring the voltage drop E across said contact interface through a circuit connected in series to the ends of the two conductors on the other end of the tubular member and then calculating the resistance from the measured quantities E and I.

References Cited
UNITED STATES PATENTS

| 2,142,619 | 1/1939 | Sciaky | 324—64 |
| 2,371,636 | 3/1945 | McConnell | 324—65 |
| 2,806,930 | 9/1957 | Yager | 324—64 X |
| 2,896,159 | 7/1959 | Webster | 324—64 |
| 3,930,113 | 3/1960 | Greco | 339—276 X |
| 2,990,501 | 6/1961 | Cornelison et al. | 174—138.5 |
| 3,009,100 | 11/1961 | Muchnick | 324—71 |
| 3,088,761 | 5/1963 | Myers | 339—276 X |
| 3,184,532 | 5/1965 | Spera | 174—138.5 |
| 3,192,474 | 6/1965 | Cherry | 324—65 |

RUDOLPH V. ROLINEC, *Primary Examiner.*

WALTER L. CARLSON, *Examiner.*

W. H. BUCKLER, E. E. KUBASIEWICZ,
*Assistant Examiners.*